US011794796B2

(12) United States Patent
Denny et al.

(10) Patent No.: US 11,794,796 B2
(45) Date of Patent: Oct. 24, 2023

(54) SYSTEM AND METHOD TO ENSURE SIGNAL LIGHT INTEGRITY AND VIEWABILITY

(71) Applicant: TekTracking, LLC, Fairport, NY (US)

(72) Inventors: Joseph M. Denny, Fairport, NY (US); Muhammad Mohsin Naseer, Punjab (PK); Gregory P. Fogarty, Fairport, NY (US)

(73) Assignee: TEKTRACKING, LLC, Fairport, NY (US)

( * ) Notice: Subject to any disclaimer, the term of this patent is extended or adjusted under 35 U.S.C. 154(b) by 1204 days.

(21) Appl. No.: 16/406,928

(22) Filed: May 8, 2019

(65) Prior Publication Data

US 2019/0344815 A1 Nov. 14, 2019

Related U.S. Application Data

(60) Provisional application No. 62/668,651, filed on May 8, 2018.

(51) Int. Cl.
*B61L 27/53* (2022.01)
*G08C 17/02* (2006.01)
*H04Q 9/00* (2006.01)

(52) U.S. Cl.
CPC ............. *B61L 27/53* (2022.01); *G08C 17/02* (2013.01); *H04Q 9/00* (2013.01); *B61L 2207/00* (2013.01); *H04Q 2209/25* (2013.01)

(58) Field of Classification Search
CPC ..... B61L 27/53; B61L 2207/00; G08C 17/02; H04Q 9/00; H04Q 2209/25
(Continued)

(56) References Cited

U.S. PATENT DOCUMENTS 6,666,411 B1 * 12/2003 Hart ................. B61L 27/20
246/182 R
2002/0008629 A1 1/2002 Jinno et al.
(Continued)

FOREIGN PATENT DOCUMENTS

CN 205785255 U * 12/2016
JP 2003237579 A * 8/2003
(Continued)

OTHER PUBLICATIONS

JP2003237579A (Yoshihiro) (Aug. 27, 2003) (Machine Translation) (Year: 2003).*

*Primary Examiner* — Mahmoud Gimie
(74) *Attorney, Agent, or Firm* — Stinson LLP

(57) ABSTRACT

A system and method is proposed to ensure detection of signal light integrity and viewability. The system includes a wireless network of signal light monitors attached unobtrusively to the sun visors on each signal light for which monitoring is required. Each signal light monitor includes diverse sensors which detect signal light integrity and viewability. The detection sensors are simultaneously active to detect signal light intensity, color intensity and viewability. The information obtained from the sensors is transmitted wirelessly to a base signal light monitor. The base signal light monitor communicates this information over a mesh network to an edge processor. The network is self-healing and ensures data integrity using a pre-calculated communication link if a communication link between base signal light monitors is lost or broken. The edge processor is capable of image and condition analysis on the detection data and communicates events to an enterprise network for action.

17 Claims, 10 Drawing Sheets

(58) Field of Classification Search
USPC .......................................................... 246/14
See application file for complete search history.

(56) References Cited

U.S. PATENT DOCUMENTS

2012/0326891 A1* 12/2012 Cross ..................... G08G 1/087
340/906
2017/0320507 A1* 11/2017 Denny ....................... E01F 9/30

FOREIGN PATENT DOCUMENTS

| WO | 2014147510 A1 | 9/2014 |
| WO | 20170320507 A1 | 11/2017 |
| WO | 2018004513 A1 | 1/2018 |

* cited by examiner

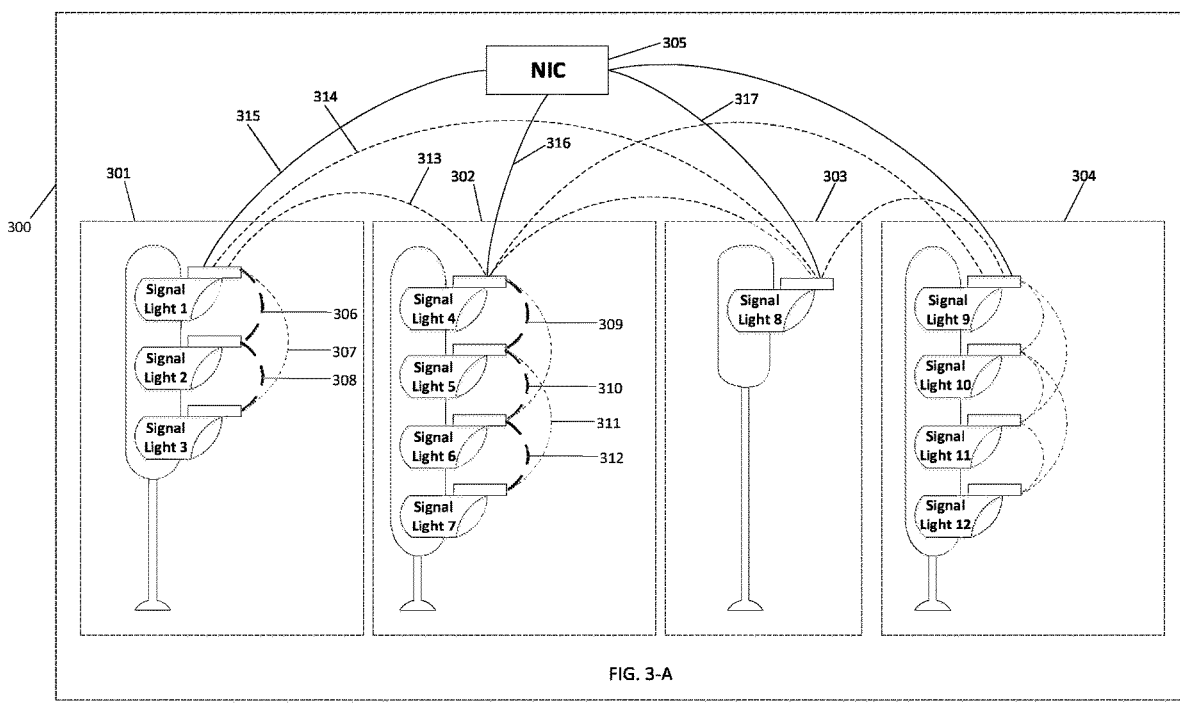
FIG. 3-A

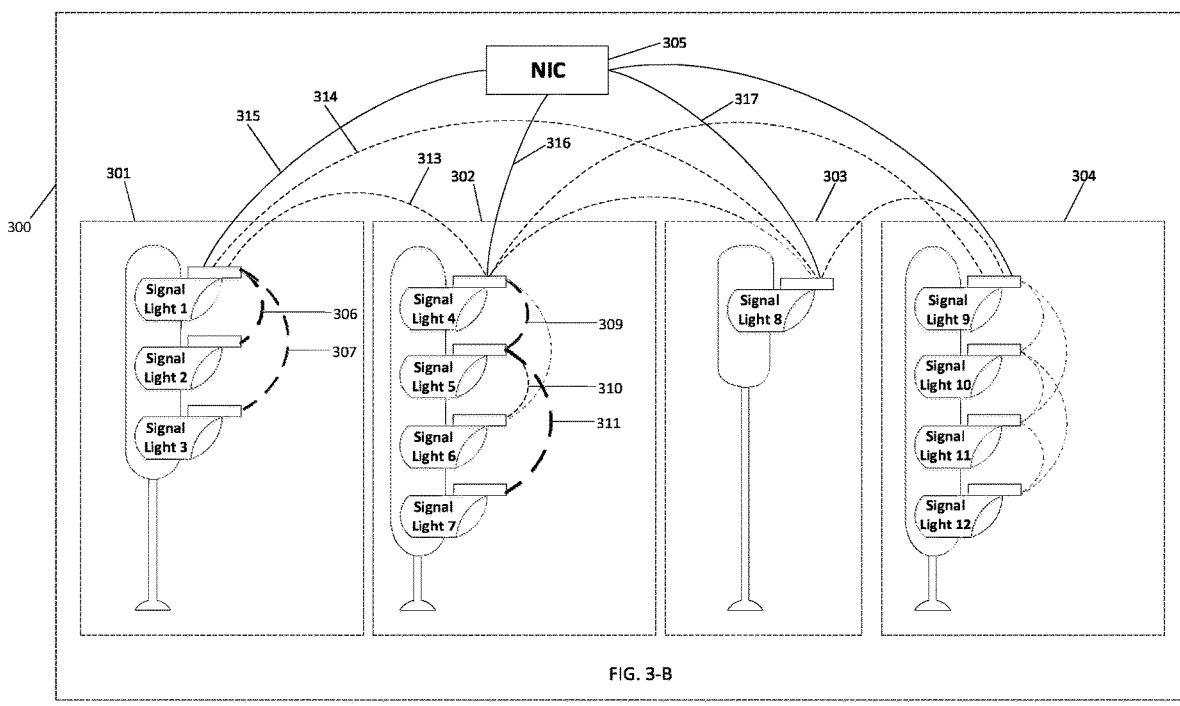
FIG. 3-B

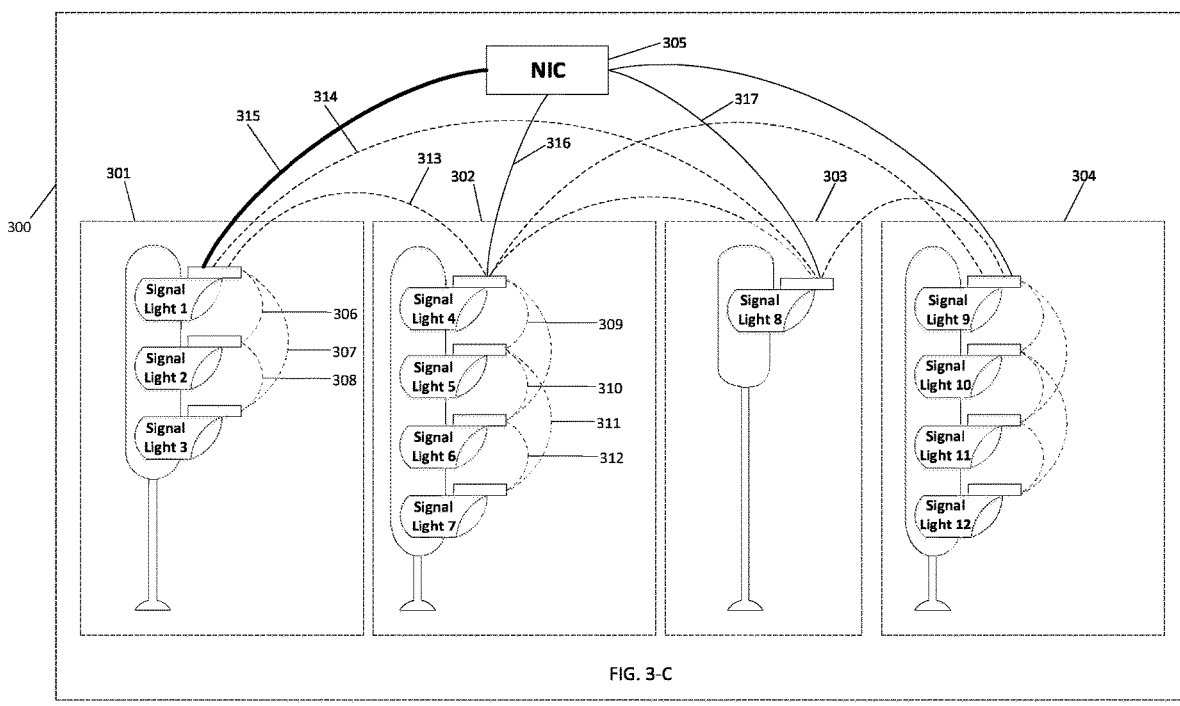
FIG. 3-C

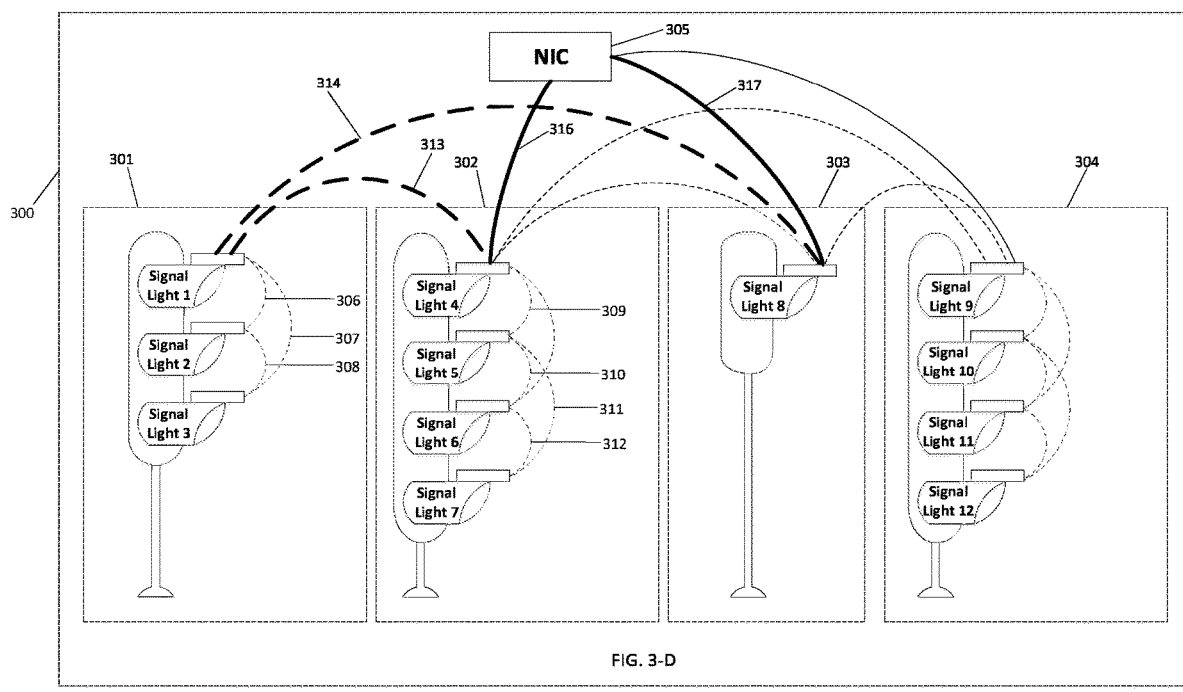
FIG. 3-D

SYSTEM AND METHOD TO ENSURE SIGNAL LIGHT INTEGRITY AND VIEWABILITY

CROSS-REFERENCE TO RELATED APPLICATIONS

This application claims priority to U.S. Provisional Application No. 62/668,651 filed on May 8, 2018, which is hereby incorporated by reference in its entirety.

FIELD OF INVENTION

The field relates to the safe and efficient operation of transit and freight rail services and, more particularly to techniques and systems for ensuring that railroad train control signal lights maintain integrity, viewability, and lens conspicuity.

BACKGROUND OF THE DISCLOSURE

To achieve safe and efficient operation, transit and rail services are frequently required to conduct periodic and scheduled maintenance of track and bridge infrastructure, rolling stock, train control systems, power systems, and other infrastructure. Signal lenses and signal lights play a significant role in railway safety.

Railroad train control signal lights and lenses are used across the globe to guide train speed and position. Because of their importance, there are safety concerns if signal lights are not clearly viewable or are not conspicuous. Signal lights may be not clearly viewable, have failed integrity, or not be conspicuous because of damage or fault with the lens or light, or due to environmental or accidental reasons. Such reasons may include the overgrowth of foliage, including tree brush or tree limbs, around or near the signal light or between the signal light and the down track viewing position.

One known method to address problems with lens conspicuity or viewability involves using a trained railroad employee who is assigned a regularly scheduled task of visually inspecting the integrity of each signal lens, and verify that intensity and conspicuity are satisfactory. This is purely a subjective visual review of the signal light with attendant risks of human error. The manual inspection also typically requires a large number of personnel to allow for the inspection of a significant network of train control signal lights stretching significant distances.

There are other known signal integrity tests that may be performed electrically on the signal equipment. In some examples, a test may be run to determine whether a bulb is powered on. In other examples, a test may be performed to check for the presence of a signal light filament. All such tests require human intervention and can only run automatically via vital signal circuits present in a local signal equipment case wired by inspection personnel to the signal lights. Likewise, the only known previous method for ensuring that the signal lens retains its mechanical integrity, generates sufficient light intensity, and provides an obstruction free view, involves a manual visual inspection that requires significant human resources to conduct over a large network of train control signal lights.

In an effort to automate the process of signal light monitoring, various systems have been proposed and developed in the past in order to monitor the normal operation of signal lights. One such system is disclosed in U.S. Pat. No. 20020008629A1 which uses current or voltage sensors connected to the signal lights for monitoring their behavior. This system is installed with the power supply line of traffic signal lights at intersections. The system includes of current or voltage sensors which generate an alternating current (AC) signal when the signal lights are illuminated. The system also includes a judgement device which generates an output of "1" or "0" depending upon the number of signal lights illuminated at the same time. As described an output value of "1" indicates that the number of signal lights simultaneously illuminated is equal to a predetermined number while an output value of "0" indicates that the number of signal lights illuminated is not equal to a predetermined number and, therefore, that a fault condition has occurred. The main utility of this system is when a green signal light or a red signal light for both vehicles and pedestrians is illuminated at the same time. This may create a dangerous situation, especially in case of a green signal light, for both pedestrian and the vehicles. A significant disadvantage of this system is that it needs to be connected with the traffic signal lights directly in order for the sensors to produce an AC signal. Further, the system may not work properly if the device is disconnected or is improperly attached to the traffic signal light. Another drawback of this system is that it does not produce any further information regarding the positioning or health of the signal light. For example, an unclear signal light or a partially powered on/off signal light may cause accidents as a result of confusion by road users but this system and other known systems are not configured to detect such problems. As such, systems for monitoring and ensuring signal light integrity, viewability, and conspicuity are desired.

BRIEF SUMMARY

A system and method is proposed to ensure detection of signal light systems, including signal lights and signal lenses, maintain integrity, viewability, and conspicuity. The system includes a network of signal light monitors in wireless communication to one another. Each of the signal light monitors is attached unobtrusively to a signal light enclosure. More specifically, each of the signal light monitors is attached to a sun visor on the signal light enclosure housing each associated signal light for which signal light monitoring is required. Each signal light monitor is equipped with a plurality of diverse sensors that detect signal light integrity, viewability, and conspicuity at all times. All of the detection sensors are simultaneously active and capable of detecting signal light intensity, color intensity and viewability. The detection sensors capture detection information including signal light intensity values, color intensity values, and viewability metrics. The detection information obtained from the sensors is transmitted wirelessly over a suitable protocol to a base signal light monitor. The wireless protocol may include, for example, a radio frequency ("RF") link, a Bluetooth® link, or any suitable protocol. The base signal light monitor may transmit the detection information over an ad-hoc wireless mesh network to a centrally located data communication and analysis edge processor for further communication and processing. The wireless network is configured to be self-healing and capable of ensuring that transmitted data, including detection information, is not lost during transmission. The wireless network ensures that data is not lost by using an alternative pre-calculated communication link. If the communication link between two signal light monitors is lost or broken, the alternative pre-calculated communication link is applied. The edge processor is capable of performing image and condition analysis on the detection data to determine viewability, integrity, and conspicuity characteristics of each signal light monitor for which detection data is captured. The edge processor is also capable to communicate all relevant events to a real time-monitoring enterprise network over cloud for further action and response. The system is also configured to compare determined viewability, integrity, and conspicuity characteristics to associated requirements. The components of the system, including the signal light monitors, the wireless network, and the edge processor are capable of retrieving such associated requirements. The components of the system may take such requirements and compare them to the viewability, integrity, and conspicuity characteristics in order to identify any signal light monitor that is not compliant with the requirements.

In a further aspect, the present disclosure relates to a method of automatically detecting and analyzing the near field color and relative brightness of a signal light. The signal light monitors described are capable of detecting near field color and light intensity values that are measured several times each day. The signal light monitors compare each measurement to baseline performance values. The baseline performance values are determined based on analysis of prior measured values that are normalized. As baseline performance values may require prior measured values, initial baselines may be received from a user input or a default. In one example, baseline performance values are initially received as user input indicating that the color of the light and the light intensity are sufficient for safe viewing. In a second example, the signal light monitors may be presumed to have color and light values that are sufficient by default. In another respect, the signal light monitors include an imaging sensor to capture the image of the clear path view of the signal light from the position of a motorist approaching the signal light. The captured image, captured by the imaging sensor, is processed in the edge processor by comparing pixel changes in the image compared to a baseline image. The baseline image may be created based upon a normalized analysis of prior captured image values. In some examples, the baseline image may not be available prior to a sufficient volume of prior captured images. In some examples, the baseline image may be captured and stored by an external camera or recording device that is input into the system via the edge processor, the signal light monitors, the network, or a suitable peripheral device in wireless communication thereto any of the system components. Such an inputted baseline image may be associated with input that indicates that the signal light is free of interference from trees, brush or other interference mechanisms. The system also includes diverse and independent means to automatically capture and analyze signal light orientation. The system continuously and non-invasively senses and detects all required and mandated signal light performance requirements, which include photometric requirements such as minimum luminous intensity. The mandated signal light performance requirements may be stored into the signal light monitors by default, stored into the edge processor by default, or retrieved from an external system into the signal light monitors or the edge processors.

The present disclosure relates to railroad train control signals, and in particular to the integrity, viewability, and conspicuity of the signal lens and signal light, particularly as seen from a distance.

In one aspect, a signal light monitoring system for detecting the integrity, viewability, and conspicuity of a network of signal lights is provided. The signal light monitoring system includes a plurality of signal light enclosures, wherein each of the signal light enclosures contains a signal light. The signal light monitoring system also includes a signal light monitor attached to each signal light enclosure. Each signal light monitor includes at least one light sensor configured to capture detection data representing signal light integrity and viewability. Each signal light monitor is configured to communicate with the other signal light monitors to form a network of signal light monitors. The signal light monitoring system also includes a network interface communicator that is configured to receive detection data from each signal light monitor. The detection data may include signal light integrity data that further includes data for the near field color and relative brightness of each signal light. The signal light monitoring system also includes a network for receiving detection data from each of the signal light monitors via the network interface communicator. The network is also capable of configuring each of the signal light monitors via the network interface communicator.

In a further aspect, a method of detecting signal light integrity, viewability, and conspicuity is provided. The method is performed by a signal light monitoring system. The signal light monitoring system includes a plurality of signal light enclosures, wherein each of the signal light enclosures contains a signal light. The signal light monitoring system also includes a signal light monitor attached to each signal light enclosure. Each signal light monitor is configured to communicate with the other signal light monitors to form a network of signal light monitors. The signal light monitoring system also includes a network interface communicator that is configured to receive detection data from each signal light monitor. The signal light monitoring system also includes a network for receiving detection data from each of the signal light monitors via the network interface communicator. The network is also capable of configuring each of the signal light monitors via the network interface communicator. Each signal light monitor includes at least one light sensor configured to capture detection data representing signal light integrity and viewability. Each signal light monitor uses the light sensor to measure a first measurement of signal light intensity, a second measurement of light orientation, and a third measurement of light viewability. The signal light monitoring system processes the first, second, and third measurements to determine at least one signal light integrity value. The signal light monitoring system retrieves at least one performance requirement associated with the signal light monitor and compares the at least one performance requirement to the signal light integrity value. Based on the comparison between the at least one performance requirement to the signal light integrity value, the signal light monitoring system determines whether each at least one signal light monitor is compliant with each at least one performance requirement. The signal light monitoring system propagates the first, second, and third measurements and the compliance determination over the wireless network via the network interface communicator.

In view of the disadvantages inherent in prior art systems, the present disclosure provides a non-intrusive, automatic and a reliable method for sensing, detecting and reporting the real time performance of signal lights.

It is a further objective of the present disclosure that each signal light monitor is attached to the a distal end of a sun visor integrated into each signal light enclosure, such that the light intensity sensor is directed towards the signal lamp and that light intensity and color are fully determinable by the at least one light sensor. The at least one light sensor may include a diverse grouping of sensors.

It is a further objective of the present disclosure that signal light monitoring be performed by a network of signal light monitors that include multiple diverse sensors. The multiple diverse sensors may include an ambient light sensor, a color light to digital converter, a camera sensor configured to capture photographs or video information, a 3-axis MEMS accelerometer or any other suitable accelerometer, an electronic compass, a microphone, and a temperature sensor. The multiple diverse sensors are configured to work simultaneously and detect the light intensity, color intensity, orientation and viewability of each associated signal light.

It is a further objective of the present disclosure that each signal light monitor determines and detects the required rotational position of each signal light based upon configuration information retrieved by the signal light monitoring system or stored locally in each signal light monitor. By determining and detecting the required rotational position of each signal light, the signal light monitoring system can compare the required rotational position to a determined actual rotational position determined by at least one of the plurality of diverse sensors. In at least some embodiments, the actual rotational position may be determined by a 3-axis MEMS accelerometer or any other suitable accelerometer, or an electronic compass. By performing such a comparison, the signal light monitoring system ensures that the aiming of the signal light does not change over time.

It is a further objective of the present disclosure that each signal light monitor can interact with the signal light monitoring system to determine whether each signal light is properly installed. Alternately, each signal light monitor can detect a failure in mounting integrity and communicated such failure to the network, including to other signal light monitors and to the edge processor.

It is a further objective of the present disclosure that the signal light sensors communicate to a base signal light monitor via Bluetooth®.

It is a further objective of the present disclosure that the base signal light monitors communicate with each other and a data communication and analysis edge processor using low duty cycle and low power radio transceivers in order to enhance and optimize battery life.

It is a further objective of the present disclosure that the base signal light monitors communicate with each other and a data communication and analysis edge processor over a secure and self-healing wireless mesh network.

It is a further objective of the present disclosure that the base signal light monitors communicate with each other and a data communication and analysis edge processor over a self-configuring wireless mesh network such that the monitors need only an initial action from an installer to start functioning.

It is a further objective of the present disclosure that the signal light monitor recharges its internal rechargeable battery solely through solar energy in some embodiments. In other embodiments, other power sources may be used including AC or DC power.

It is a further objective of the present disclosure that the edge processor provides processing of data and centralized event reporting and recording for data requiring historical analysis.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 3-A is a second diagram showing the peer-to-peer redundant wireless mesh communication between signal light monitors and the network interface communicator ("NIC").

FIG. 3-B shows a third diagram of the peer-to-peer redundant wireless mesh communication and specifically shows alternate communication paths if a communication link is broken between two signal light monitors.

FIG. 3-C shows a fourth diagram of the peer-to-peer redundant wireless mesh communication and specifically shows when a base signal light monitor at a signal light communicates its own detection data combined with detection data received from all signal light monitors using a NIC and a direct communication link.

FIG. 3-D shows a fifth diagram of the peer-to-peer redundant wireless mesh communication and specifically shows how the system addresses a broken direct communication link between base signal light monitor at Signal Light 1 and the network interface communicator.

DETAILED DESCRIPTION

Figure 1:
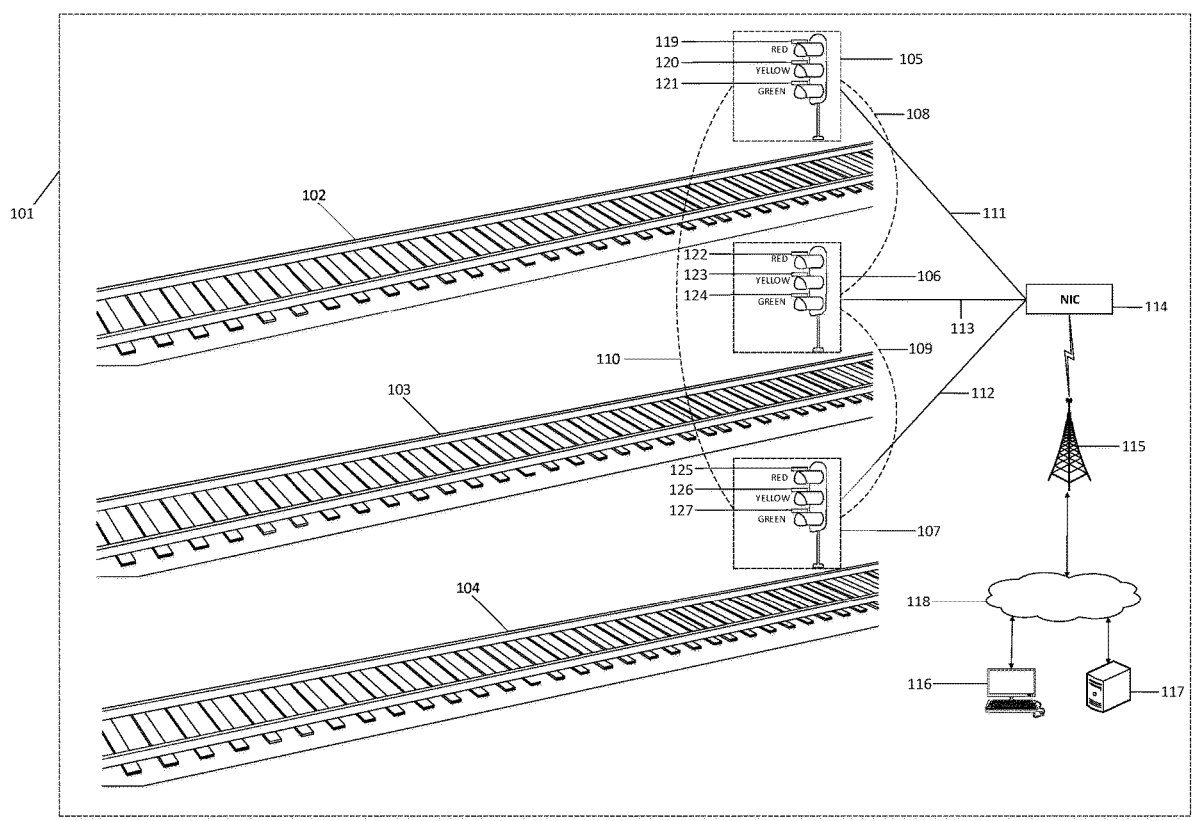
FIG. 1 is a system diagram providing an overview of signal lights around multiple railroad tracks including an exemplary signal light monitoring system wherein the system includes a network of signal light monitors and an edge processor connected to an enterprise network over cloud.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term processor refers to central processing units, microprocessors, microcontrollers, reduced instruction set circuits (RISC), application specific integrated circuits (ASIC), logic circuits, and any other circuit or processor capable of executing the functions described herein.

Before describing in detail embodiments that are in accordance with the present disclosure, it should be observed that the embodiments reside primarily in combinations of method steps, system elements, and device components related to providing signal light monitoring. Accordingly, the device components, system elements, and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relative relational terms such as first and second, top and bottom, and the like may be used solely to distinguish one entity or action from another entity or action without necessarily requiring or implying any actual such relationship or order between such entities or actions.

The terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device. An element proceeded by "comprises . . . a" does not, without more constraints, preclude the existence of additional identical elements in the process, method, article, or device that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of providing signal light monitoring as described herein. The non-processor circuits may include, but are not limited to, a radio receiver, a radio transmitter, signal drivers, clock circuits, power source circuits, and user input devices. As such, these functions may be interpreted as steps of a method to provide signal light monitoring. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

Further, it is expected that one of ordinary skill, notwithstanding possibly significant effort and many design choices motivated by, for example, available time, current technology, and economic considerations, when guided by the concepts and principles disclosed herein will be readily capable of generating described software instructions and programs and ICs with minimal experimentation.

The systems and methods described relate to providing signal light monitoring systems to ensure that signal lights maintain light integrity, viewability, and conspicuity. The systems and methods constitute a practical application of disclosed signal light monitoring approaches in order to provide a technological solution to the problems described above.

The embodiments described herein relate to monitoring signal light integrity and viewability. The system is based on a communication network of signal light monitors and a network interface communicator wherein the signal light monitors non-invasively detect and monitor the current health parameters including but not limited to light intensity, color intensity and viewability of signal lights. The system further includes an enterprise network which provides real time remote monitoring of signal light health based on data provided by the network interface communicator.

The embodiments described herein provide a reliable and efficient system utilizing multiple diverse detection sensors including at least one of an ambient light sensor; a color light to digital converter; a camera sensor; a 3-axis MEMS accelerometer; a compass; a microphone; and a temperature sensor, which are simultaneously active to detect signal light integrity and viewability. The base signal light monitor communicates with sensors via Bluetooth® while it establishes a peer to peer wireless mesh communication network using low power radio transceivers operating in the industrial, scientific and medical radio band (ISM band). Moreover, the system also provides a real time monitoring system for viewing the health of the network of signal lights being monitored by the system.

In some examples, the signal light monitoring system includes (a) a sensor unit consisting of a plurality of simultaneously active diverse sensors configured to detect signal light intensity, orientation, and viewability of each said signal light, (b) a wireless communication module, (c) a processor configured to execute logic for establishing a peer-to-peer wireless mesh network of said signal light monitors and communicating said detection data for signal light monitors, and (d) a power management system for providing power to the signal light monitoring system. In some examples, the power management system uses AC or DC power, battery power, or any other suitable power source. In at least one example, the power management system is solar based. In such examples, the power management system includes a charger responsible for charging backup batteries through solar energy and generating appropriate voltages required for functioning of various components of said signal light monitor, a rechargeable battery capable of being charged through solar energy, and a solar panel.

FIG. 1 is a system diagram showing three (3) railroad tracks 102, 103 and 104 equipped with a signal light monitoring system according to one preferred embodiment of the present disclosure. The system 101 includes a wireless mesh network with communications paths 108, 109, 110, 111, 112, 113 between signal light monitors and a network interface communicator ("NIC") 114, which is coupled to a cloud system comprising component cloud server 115 and cloud storage 118 and an enterprise reporting system with component system 116 and server 117. Three (3) signal light posts 105, 106 and 107 are shown with a signal light monitor 119, 120, 121, 122, 123, 124, 125, 126, 127 attached to the sun/rain visor of each individual signal light. Each signal light monitor 119, 120, 121, 122, 123, 124, 125, 126, 127 can be attached and detached from the signal light sun/rain visor of each signal light enclosure easily. Each signal light monitor 119, 120, 121, 122, 123, 124, 125, 126, 127 also contains diverse sensors configured to monitor signal light health at all times. Each signal light monitor 119, 120, 121, 122, 123, 124, 125, 126, 127 communicates with each other signal light monitor, and with a network interface communicator, ("NIC") 114 using spread spectrum radio transceivers which form a peer-to-peer wireless mesh network such that each signal light monitor 119, 120, 121, 122, 123, 124, 125, 126, 127 is connected to at least two (2) signal light monitors directly. In the exemplary embodiment, the wireless communications take place in the 900 MHz ISM band. Alternatively, other communications bands or platforms may be used. Data communicated from each signal light monitor 119, 120, 121, 122, 123, 124, 125, 126, 127 over the wireless mesh network includes detection data captured by the diverse sensors of each monitor. The detection data includes measured values for signal light intensity, signal light color, orientation and motion as determined by a 3 axis accelerometer or compass, sound data received from a microphone and temperature measurements. Detection data may also include photographs, videos, and other information related to signal light integrity, viewability, and conspicuity.

One signal light monitor on each signal post is designated as the base signal light monitor and is responsible for communicating all data from signal light monitors on a post with the network interface communicator 114. (In the example embodiment, signal light monitors 119, 122, and 125 are designated as the base signal light monitors for posts 105, 106, and 107, respectively. In other embodiments, other signal light monitors may be designated as base signal light monitors.) Monitor designation is accomplished through firmware configuration which can preassign an appropriate designation for each monitor. The network interface communicator ("NIC") 114 manages communications with base signal light monitors and alerts the network if a particular base signal light monitor does not report data or reports corrupted data, either of which will flag a failure condition. The broken lines 108, 109 and 110 show the peer-to-peer wireless mesh communication links between base signal light monitors 119, 122 and 125 respectively. The solid lines 111, 112 and 113 represent the peer-to-peer wireless mesh communication links between base signal light monitors 119, 122 and 125 and the network interface communicator 114. The network interface communicator ("NIC") 114 performs processing on the data received from base signal light monitors 119, 122 and 125 and communicates all processed data periodically to a remote server 117. The network interface communicator 114 communicates status indicators for signal light measurements. In some examples, the status indicators for signal light measurments may be binary or Boolean, and reflect whether a monitor detects that: (a) light intensity is sufficient (yes or no); (b) light color is correct (yes or no); (c) sound level measured in range (yes or no); (d) signal mast orientation unchanged (yes or no); and (e) down range view of signal light is clear (yes or no). The communication between remote server 117 and network interface communicator 114 takes place over a cellular network 115 and an IP cloud 118. The signal light health data can be viewed through an enterprise real time signal monitoring system 116 as shown in the figure.

Figure 2:
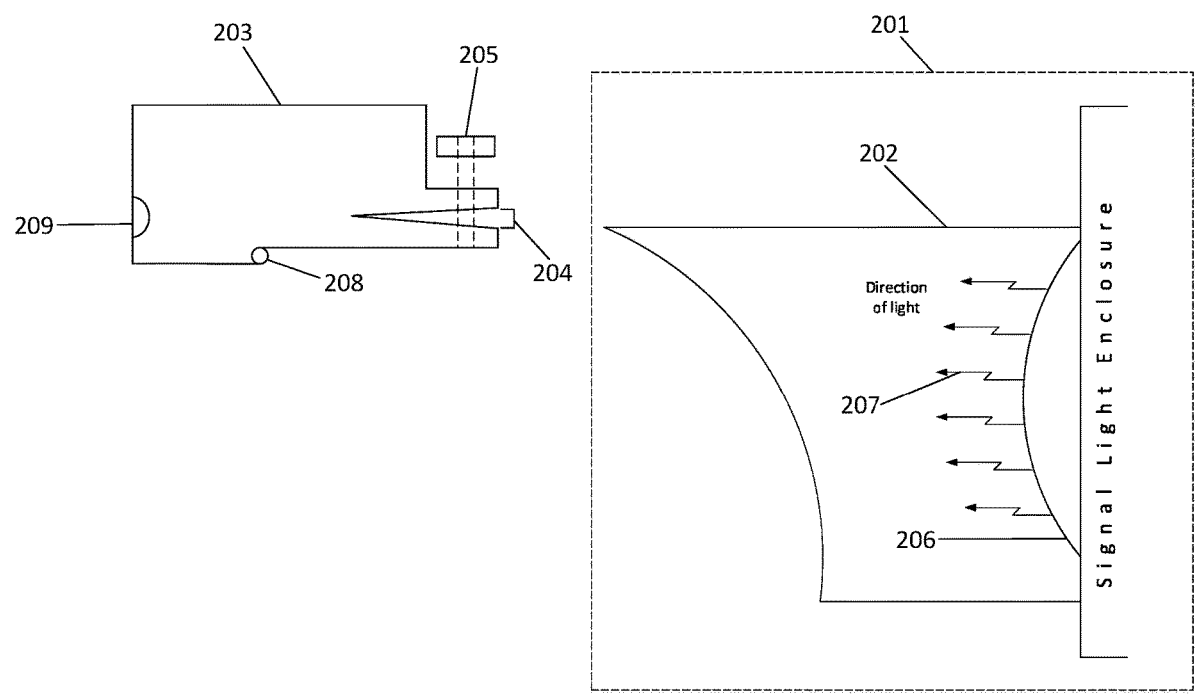
FIG. 2 is a diagram showing the mounting mechanism of the signal light monitor on the sun and/or rain visor to provide signal light monitoring for signal lights.

FIG. 2 shows the method to attach the signal light monitor to a signal light in a side view. A complete signal light enclosure 201 is shown in the figure. The enclosure 201 includes a sun/rain visor 202 to protect the light 206, along with the other enclosed elements, from direct sunlight, snow and rain drops. A signal light monitor 203 is shown with a split base 204. The split base 204 is designed to slide over and under the edge of sun/rain visor 202. A machine screw hold down 205 is used to secure the signal light monitor 203 to the sun/rain visor 202. A color light to digital converter sensor 208 is located beneath the split base 204 which faces the signal light 206 directly. When active, an energized signal light transmits light 207 in direction of the color light to digital converter sensor 208 which senses the color and intensity of the light. In addition, a camera sensor 209 located on the outside edge of the signal light monitor and on top of the sun/rain shield with a full view of the down-track from the perspective of the signal light aiming direction. The signal light enclosure 201 is transparent so as to allow sun light to recharge a rechargeable battery through solar light where a rechargeable battery is used. Although not shown, the signal light monitor 203 may include additional diverse sensors including, for example, an ambient light sensor, a 3-axis MEMS accelerometer, a compass, a microphone, and a temperature sensor.

Figure 3:
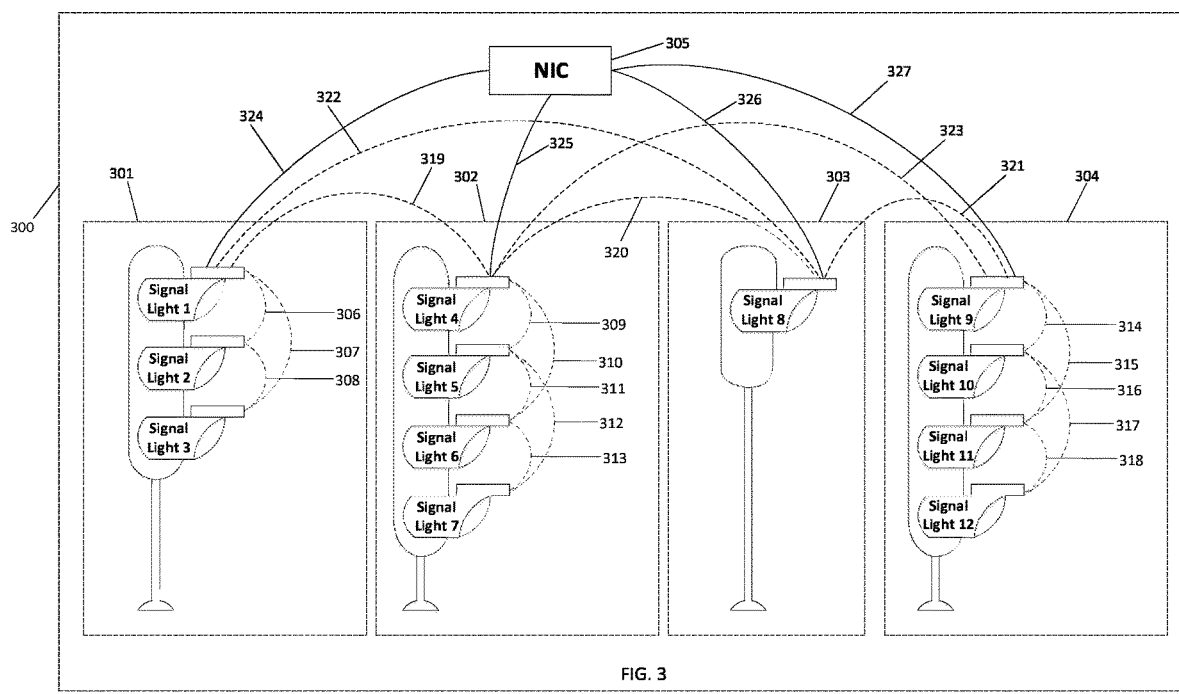
FIG. 3 is a first diagram showing the peer-to-peer redundant wireless mesh communication links between signal light monitors and the network interface communicator ("NIC").

FIG. 3 shows the peer-to-peer wireless mesh communication between signal light monitors (described in FIG. 2) and network interface communicator ("NIC") 305. Four (4) signal light posts 301, 302, 303 and 304 are shown with signal light monitors attached to each of the individual signal lights labelled Signal Light 1 through Signal Light 12. Two wireless mesh communication networks exist, one between signal light monitors on each signal post, while another exists between each base signal light monitor and network interface communicator 305. In the example embodiment, Signal light monitors attached to Signal Light 1, Signal Light 4, Signal Light 8, Signal Light 9 are pre-configured as base signal light monitors for their respective signal posts 301, 302, 303 and 304. In this embodiment, Signal light monitors attached to Signal Light 2 and Signal Light 3 communicate their detection data wirelessly to the base signal light monitor attached with Signal Light 1. Communication link 306 shows the communication link between signal light monitors attached to Signal Light 1 and Signal Light 2, communication link 308 shows the communication link between signal light monitors attached to Signal Light 2 and Signal Light 3 while communication link 307 shows a direct communication link between signal light monitors attached to Signal Light 1 and Signal Light 3. A signal light monitor attached to Signal Light 3 communicates its detection data to signal light monitor attached with Signal Light 2 via communication link 308 which in turn communicates its own detection data including the data received from its neighboring signal light monitor at Signal Light 3 to base signal light monitor at Signal Light 1 via communication link 306. If the communication link 308 between signal light monitors at Signal Light 2 and Signal Light 3 breaks, a direct communication link 307 between signal light monitors at Signal Light 1 and Signal Light 3 exists which helps signal light monitor at Signal Light 3 to communicate its detection data directly to the base signal light monitor at Signal Light 1. The data exchange between signal light monitors is periodic. The limited use helps save battery life. Likewise as with signal post 301, for signal post 302, a communication link 309 exists between base signal light monitor at Signal Light 4 and signal light monitor at Signal Light 5, communication link 311 exists between signal light monitors at Signal Light 5 and Signal Light 6 while communication link 313 exists between signal light monitors at Signal Light 6 and Signal Light 7. Alternatively, a direct communication link 312 between signal light monitors at Signal Light 5 and Signal Light 7 and one direct communication link 310 between base signal light monitor at Signal Light 4 and signal light monitor at Signal Light 6 exists if the neighboring link is unavailable. This wireless mesh communication between the base signal light monitor and signal light monitors on the same signal post takes place using a Zigbee® XBee-PRO 900 HP module. In an alternative embodiment, this communication between signal light monitors on a signal post may take place using a low energy Bluetooth® module.

The second peer-to-peer wireless mesh communication network exists between base signal light monitors attached to Signal Light 1, Signal Light 4, Signal Light 8, Signal Light 9 and network interface communicator ("NIC") 305. Base signal light monitors attached to Signal Light 1, Signal Light 4, Signal Light 8, Signal Light 9 communicate directly with NIC 305 through direct communication links 324, 325, 326 and 327 respectively. If the direct communication link between base signal light monitor at Signal Light 1 and NIC 305 breaks, the base signal light monitor has a communication link 319 with base signal light monitor at Signal Light 4 or a communication link 322 with base signal light monitor at Signal Light 8 which can communicate detection data received from base signal light monitor at Signal Light 1 with NIC 305. Similarly, if the direct communication link 325 between base signal light monitor at Signal Light 4 and NIC 305 breaks, the base signal light monitor at Signal Light 4 has a communication link 320 with base signal light monitor at Signal Light 8, a communication link 323 with base signal light monitor at Signal Light 9 and a communication link 319 with base signal light monitor at Signal Light 1 all of which can communicate detection data received from base signal light monitor at Signal Light 4 with NIC 305. Also, if the communication link 326 of base signal light monitor at Signal Light 8 with NIC 305 breaks, a communication link 321 is available between base signal light monitor at Signal Light 8 and base signal light monitor at Signal Light 9, another communication link 320 exists between base signal light monitor at Signal Light 8 and base signal light monitor at Signal Light 4 and one direct communication link 322 between base signal light monitor at Signal Light 8 and Signal Light 1. Therefore, in case the direct communication link 326 between base signal light monitor at Signal Light 8 and NIC module 305 fails, the base signal light monitor at Signal Light 8 can communicate its detection data to base signal light monitors attached to either Signal Light 9, Signal Light 4 or Signal Light 1 through communication links 321, 320, 322 respectively and these base signal light monitors at Signal Light 9, Signal Light 4 or Signal Light in turn communicate the data with NIC 305 through communication links 327, 325 or 324 respectively. Four (4) signal light monitors are located at signal post 304 which consist of a base signal light monitor at Signal Light 9 and three (3) signal light monitors at Signal Light 10, Signal Light 11 and Signal Light 12. A communication link 314 exists between base signal light monitor at Signal Light 9 and signal light monitor at Signal Light 10. The base signal light monitor at Signal Light 9 also has a direct communication link 315 with the signal light monitor at Signal Light 11. Similarly, signal light monitor at Signal Light 10 has a communication link 316 with signal light monitor at Signal Light 11. Signal light monitor at Signal Light 10 also has a communication link 317 with signal light monitor at Signal Light 12. A communication link 318 exists between signal light monitor at Signal Light 11 and Signal Light 12.

The network interface communications ("NIC") 305 is master node of the complete wireless mesh communication network 300. Although NIC 305 is able to communicate with all signal light monitors, it collects all detection data from base signal light monitors only so that all signal light monitors do not flood NIC 305 with their detection data at the same time making it impossible for NIC 305 to process a large number of data packets at once. Therefore, NIC 305 periodically sends a heartbeat to each base signal light monitor. If NIC 305 receives an acknowledgement for the heartbeat message, it means that the base signal light monitor is functioning properly. If NIC 305 does not receive an acknowledgement for the heartbeat message from base signal light monitor in five consecutive retries, it means there is some problem with the base signal light communication link. NIC 305 records this event with a tag and timestamp for the particular base signal light monitor in order to display this event for diagnostic purpose on the enterprise real time monitoring system. NIC 305 then communicates with the nearest signal light monitor on that post which has the strongest received signal strength indicator (RSSI) value of the Xbee module. NIC 305 assigns the base signal light monitor responsibility to the nearest signal light monitor and all signal light monitors on that signal post then communicate their detection data with the new base signal light monitor. For example, if NIC 305 communication link 326 with base signal light monitor attached to Signal Light 1 breaks, NIC 305 assigns signal light monitor attached to Signal Light 2 as the base signal light monitor. The new base signal light monitor attached to Signal Light 2 communicates its updated role with signal light monitor attached at Signal Light 3 so that signal light monitor attached with Signal Light 3 communicates all its detection data through communication link 308 with the new base signal light monitor attached at Signal Light 2. The base signal light monitor at Signal Light 2 then communicates all detection data received from all signal light monitors available at signal post 301 with NIC 305 for further processing.

FIG. 3-A shows the peer-to-peer wireless mesh communication between signal light monitors and network interface communicator (NIC). Four (4) signal light posts 301, 302, 303 and 304 are shown with signal light monitors attached to each of the individual signal lights labelled Signal Light 1 through Signal Light 12. Two wireless mesh communication networks exist, one between signal light monitors on each signal post, while another between base signal light monitors and network interface communicator 305. FIG. 3-A and FIG. 3-B show the healing wireless mesh communication network between signal light monitors on a signal post. Signal light monitors attached to Signal Light 1, Signal Light 4, Signal Light 8, Signal Light 9 are pre-configured as base signal light monitors for their respective signal posts 301, 302, 303 and 304. FIG. 3-A shows that for signal post 301 signal light monitor attached to Signal Light 3 communicates its detection data to base signal light monitor at Signal Light 1 by first communicating its detection data to signal light monitor at Signal Light 2 through wireless communication link 308. Signal Light 2 then communicates its own detection data combined with detection data received from signal light monitor at Signal Light 3 through wireless communication link 306 to base signal light monitor at Signal Light 1. Similarly, for signal post 302, signal light monitor at Signal light 7 communicates its detection data to signal light monitor at Signal Light 6 through communication link 312. Signal light monitor at Signal Light 6 further communicates its detection data to signal light monitor at Signal Light 5 along with detection data received from signal light monitor at Signal Light 7 through communication link 310. In turn, signal light monitor at Signal Light 5 communicates its detection data combined with data received from signal light monitors at Signal Light 6 and Signal Light 7 to base signal light monitor at Signal Light 4 through communication link 309.

FIG. 3-B shows alternate communication paths if a communication link is broken between two signal light monitors. If the communication link 308 (from FIG. 3-A) between signal light monitor at Signal Light 3 and signal light monitor at Signal Light 2 from signal post 301 breaks, signal light monitor at Signal Light 3 communicates its detection data directly with base signal light monitor at Signal Light 1 through communication link 307. Similarly, if communication link 312 (from FIG. 3-A) between signal light monitors at Signal Light 7 and Signal Light 6 breaks, signal light communicates its detection data to signal light monitor at Signal Light 5 through a direct communication link 311. Signal light monitor at Signal Light 5 communicates its own detection data combined with detection data received from signal light monitor at Signal Light 7 with base signal light monitor at Signal Light 4 through communication link 309.

FIG. 3-C shows that base signal light monitor at Signal Light 1 communicates its own detection data combined with detection data received from all signal light monitors at signal post 301 with network interface communicator 305 through a direct communication link 315.

FIG. 3-D shows a broken direct communication link (315 from FIG. 3-C) between base signal light monitor at Signal Light 1 and network interface communicator 305. In this case, base signal light monitor at Signal Light 1 communicates all detection data from signal light monitors at signal post 301 with base signal light monitor at Signal Light 4 through communication link 313. Base signal light monitor at Signal Light 4 communicates all detection data received from base signal light monitor at Signal Light 1 (containing detection data from all signal light monitors at signal post 301) combined with all detection data from signal light monitors at signal post 302 through communication link 316 with network interface communicator 305. Another alternate communication path between base signal light monitor at Signal Light 1 and network interface communicator 305 also exists in which base signal light monitor at Signal Light 1 communicates all detection data from signal post 301 with base signal light monitor at Signal Light 8 through communication link 314. Base signal light monitor at Signal Light 8 communicates all detection data received from base signal light monitor at Signal Light 1 combined with its own detection data with network interface communicator 305 through communication link 317.

Figure 4:
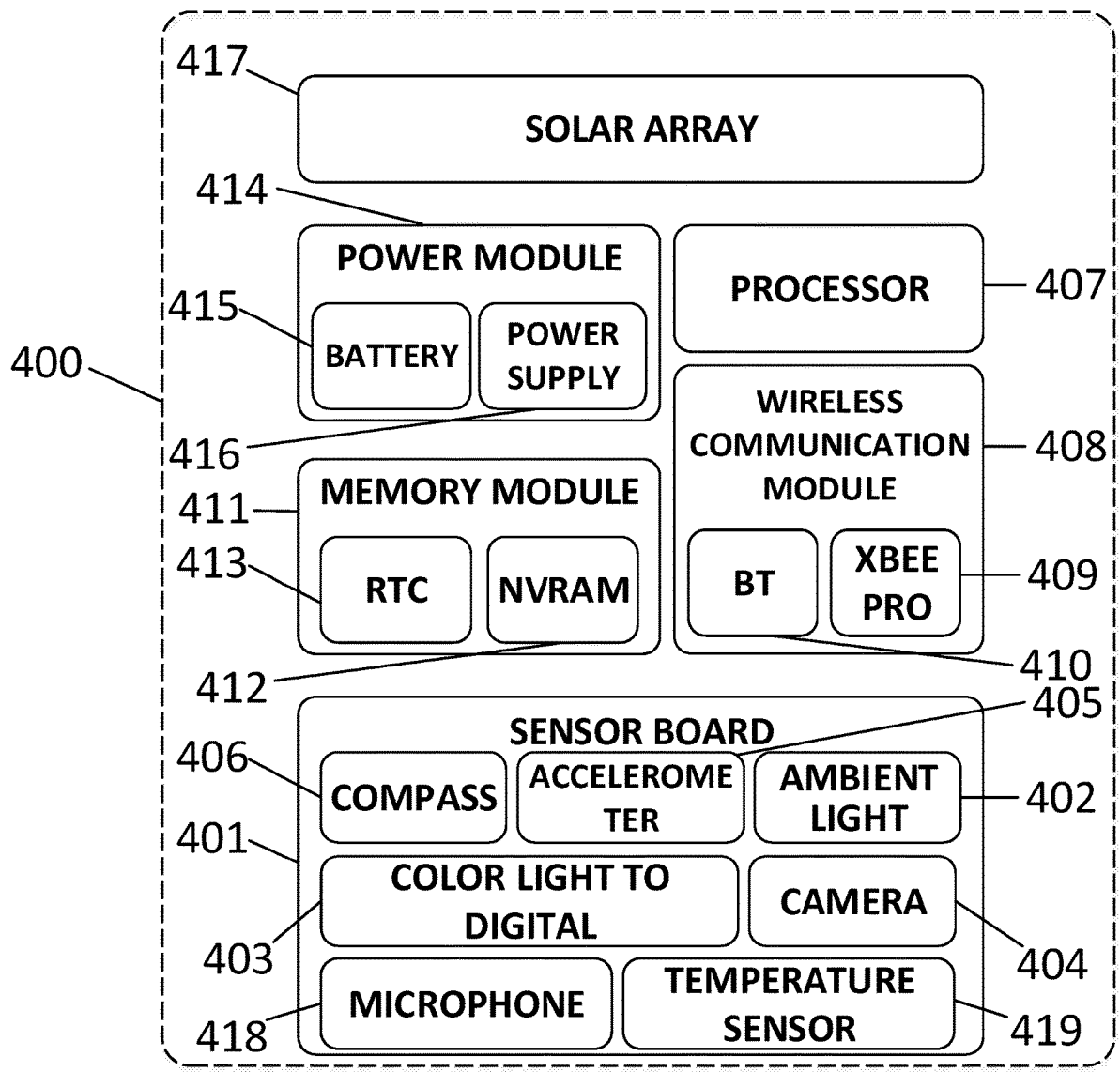
FIG. 4 is a diagram showing components included within an example signal light monitor.

FIG. 4 shows a block diagram depicting various components of signal light monitor 400. Signal light monitor 400 contains a sensor board 401 including a wide array of diverse sensors 402, 403, 404, 405, 406, 418, and 419. In some embodiments, the sensor board 401 may include additional sensors with additional capabilities, and in some examples, only a portion of the disclosed sensors may be included in sensor board 401. The sensor board 401 includes a low powered R/G/B/C color light to digital sensor 403 which senses red, green, blue and clear light intensity during different lighting conditions. The color light to digital sensor 403 provides a digital light intensity value for a particular colored signal light on which it is installed and this value is used to identify if the signal light intensity is within a normal sensing range. In one embodiment of the disclosure, the value of signal light intensity measured in lumens by color light to digital sensor 403 is compared to the minimum required luminous intensity in candela for a LED signal module as specified by Transport Canada Engineering Standards for LED Signal Modules which follow the American Railway Engineering and Maintenance of Way Association (AREMA) standard for LED signal modules. In the example embodiment, such standards information for signal light viewability, integrity, and conspicuity may be included within the memory module 411 of each signal light monitor 400 or available from the network interface communicator (NIC). The luminous intensity values specified by Transport Canada are converted to lumens before comparing with the values measured by the color light to digital converter 403. The measured light intensity values for each color signal light are compared to the minimum luminous intensity values for the three different colored lights as specified by Transport Canada in the following Table A-1.

TABLE A-1

Minimum Luminous Intensity (Candela) over its Lifetime
(L: left, R: right)

| | | Horizontal Spread (at 0° vertical angle) | | | | | |
|---|---|---|---|---|---|---|---|
| | 0° | +3° L/R | +6° L/R | +8° L/R | +10° L/R | +11° L/R | +12° L/R |
| Red | 600 | 450 | 169 | 94 | 49 | 30 | 15 |
| Yellow | 1725 | 1275 | 375 | 131 | 86 | 68 | 49 |
| Green | 600 | 375 | 169 | 94 | 49 | 30 | 15 |

Data for standards similar to that depicted in Table A-1 may be encoded on memory module 4011, or otherwise available, and may describe standards for light integrity, viewability, and conspicuity. A low powered ambient light sensor 402 is also available on the sensor board 400 which senses the intensity of light from an illuminated signal light. The ambient light sensor 402 confirms that the signal light is fully illuminated or not by sensing and providing a light intensity value in lumens. The light intensity value from the ambient light sensor is also compared with the standard minimum luminous intensity value provided in the table above. A camera sensor 404 available on the sensor board 401 is simultaneously oriented on the signal light monitor with other sensors such that the camera sensor 404 has a full view of the down track image from the perspective of the signal light aiming direction. Images captured by camera sensor 404 ensure that the signal light view is unobstructed due to vegetation growth or other external obstruction of the view and no change in orientation of signal light has occurred. An accelerometer 405 available on the sensor board 401 is used to detect any change in orientation of the signal light by sensing the vibrations. In one example, accelerometer 405 may be a 3-axis MEMS accelerometer. If vibrations measured by the accelerometer are continuous, it means that the signal light fixture is not stable and may not be in a normal orientation. Similarly, a compass 406 is available on the sensor board 401 which detects a change in orientation of the signal light. A microphone 418 is also available on the sensor board 401 which detects the bell sound generated upon the grade crossing signal being activated. This assists the color light to digital converter 403 and ambient light sensor 402 to activate to record signal light intensity readings only when the signal light is illuminated. In another embodiment the microphone 418 also records the surrounding sound level with respect to the position where the signal light monitor is installed. If the surrounding sound level recorded/sensed by the microphone is within a predetermined range, the bell on the signal light is declared to be properly functioning and if the sound level recorded/sensed by the microphone is outside the predetermined range, the bell on the signal light is declared failed. A temperature sensor 419 is also available on the sensor board 401 which senses the temperature of signal light monitor enclosure. This is particularly important because if the temperature of the signal light monitor enclosure is too high or too low that is below −40 degree Celsius or above 70 degrees Celsius which are specified as normal operational conditions by Transport Canada Engineering Standards for LED Signal Modules, the signal light monitor components may not function properly.

The processor 407 is responsible for executing the signal light monitor software which includes functions such as performing startup verifications, processing parameters received from detection sensors, execution of a battery voltage monitoring algorithm and preparation of data packets to be transmitted to the connected signal light monitors and network interface communicator over the wireless network. The signal light monitor also includes a wireless communication module 408 which is further comprised of a low power radio transceiver 409 and a low power Bluetooth® module 410. In the exemplary embodiment, the RF transceiver 409 includes, for example, an XBee-PRO 900 HP module which is configured to create peer-to-peer wireless mesh communication network with other signal light monitors and NIC. The low power Bluetooth® module 410 may also be used for communication between signal light monitors on a signal post. The configuration parameters for various components of the signal light monitor 203 are stored on the non-volatile memory 412 available in the memory module 411. A real time clock RTC 413 is also available in the memory module 411 for all time keeping purposes.

A power module 414 contains components to provide power to various components of signal light monitor 203. The power module 414 includes a rechargeable battery 415 which provides battery backup to the signal light monitor 203. The power module 414 is also responsible for battery voltage monitoring where the power supply unit 416 monitors the state of charge of rechargeable battery 415 and generates alerts in case the battery 415 gets low. A solar array 417 is also available to charge the rechargeable battery 415 through solar energy.

Figure 5:
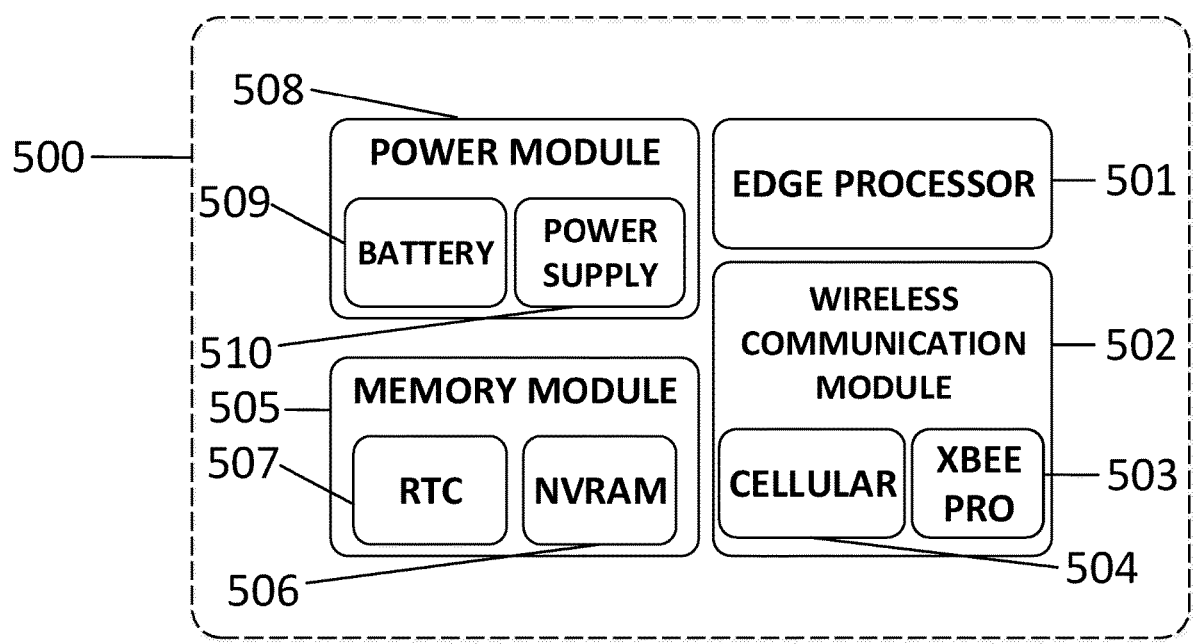
FIG. 5 is a block diagram showing various components of an example network interface communicator ("NIC").

FIG. 5 shows various components of the network interface communicator 500. The edge processor 501 is responsible for executing the network interface communicator software which includes functions such as performing startup verifications, processing data such as images received from signal light monitors and performing image and data analysis, administering the health of wireless communication links for all signal light monitors, execution of a battery voltage monitoring algorithm and preparation of data packets to be communicated with the signal light monitors and remote server. The network interface communicator 500 also includes a wireless communication module 502 which further consists of a low power radio transceiver 503 and a cellular modem 504. In the exemplary embodiment, the RF transceiver 503, for example, includes an XBee-PRO 900 HP module which is configured to create a peer-to-peer wireless mesh communication network with signal light monitors. The cellular modem 504 is configured to communicate signal light monitor detection data with the remote server. The configuration parameters for various components of the network interface communicator 114 are stored on the non-volatile memory 506 available in the memory module 505. A real time clock RTC 507 is also available in the memory module 505 for all time keeping purposes. The power module 508 contains components to provide power to components of the network interface communicator 114. The power module 508 is also responsible for battery voltage monitoring where the power supply unit 510 monitors the state of charge of rechargeable battery 509 and generates alerts in case the battery 509 gets low.

Figure 6:
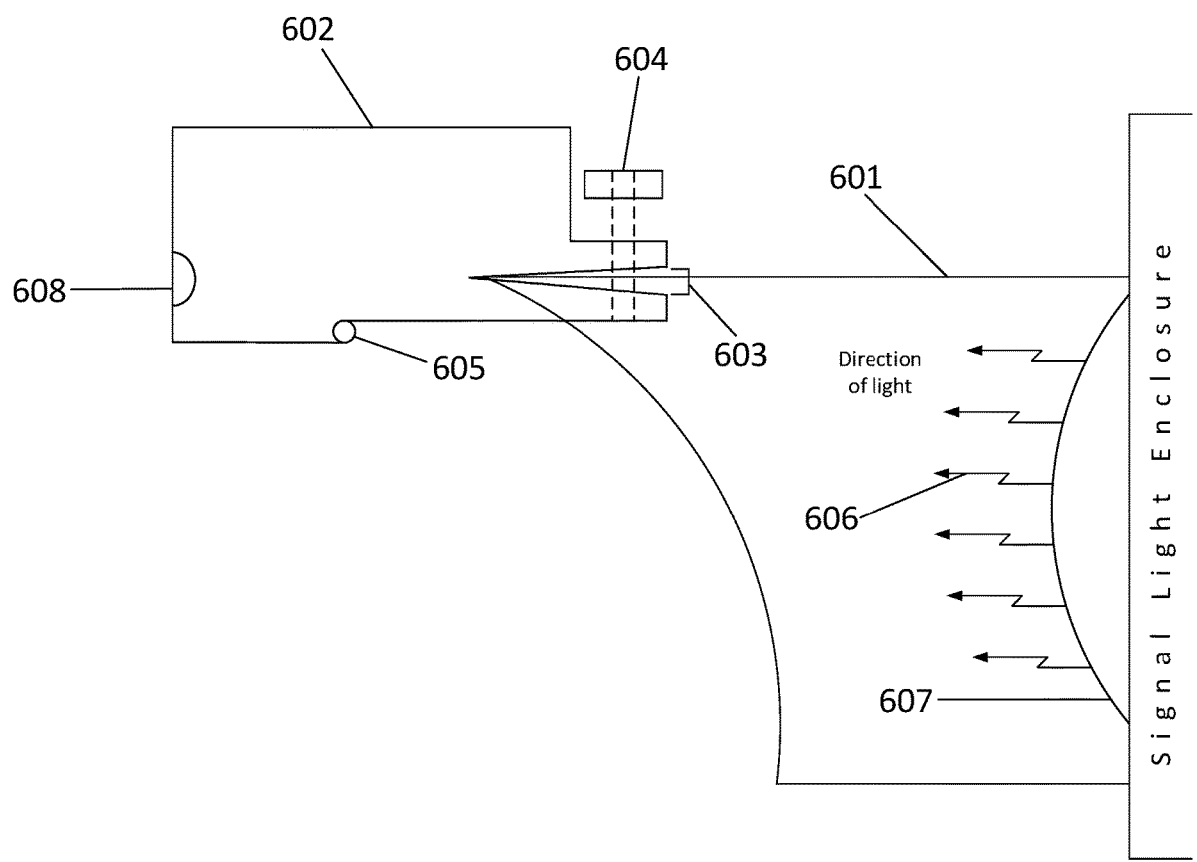
FIG. 6 is a diagram showing a signal light monitor mounted onto the sun and/or rain visor of a signal light enclosure to provide signal light monitoring for signal lights.

FIG. 6 shows a signal light monitor attached to a signal light in a side view. A signal light monitor 602 is shown attached to the sun/rain visor 601 with a split base 603. The split base 603 slides over and under the edge of sun/rain visor 601 and a machine screw hold down 604 is used to secure the signal light monitor 602 to the sun/rain visor 601. The color light to digital converter 605 faces the direction of light 606 emitted from the signal light 607. The camera sensor on the signal light monitor 602 is also shown which is located on the outside edge of the signal light monitor 608.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. A signal light monitoring system for detecting the signal light integrity and viewability of a network of signal lights, the system comprising:
   a plurality of signal light enclosures, wherein each of the plurality of signal light enclosures contains a signal light;
   a plurality of signal light monitors attached to each signal light enclosure, wherein each of the signal light monitors includes at least one light sensor configured to capture detection data representative of signal light integrity and viewability, wherein each signal light monitor is configured to communicate with each other to form a network of signal light monitors;
   at least one network interface communicator comprising at least a wireless communication module, an edge processor, and a rechargeable battery, wherein said network interface communicator is configured to receive detection data from each signal light monitor; and
   a network for receiving the detection data provided by signal light monitors and for configuring the signal light monitors via the at least one network interface communicator.

2. The signal light monitoring system of claim 1 wherein said signal light monitors are configured to detect signal light intensity, orientation, viewability and to propagate said detection data along said network, wherein said network is a peer-to-peer wireless mesh network.

3. The signal light monitoring system of claim 1 further comprising a structure coupled to each said signal light for selectively positioning each said signal light monitor onto each said signal light.

4. The signal light monitoring system of claim 3 wherein said structure further comprises a visor attached to an enclosure housing each signal light, wherein each said signal light monitor is configured to couple with said visor.

5. The signal light monitoring system of claim 1, wherein said signal light monitor includes at least:
   a. a sensor unit consisting of a plurality of simultaneously active diverse sensors configured to detect signal light intensity, orientation, and viewability of each said signal light;
   b. a wireless communication module;
   c. a processor configured to execute logic for establishing a peer-to-peer wireless mesh network of said signal light monitors and communicating said detection data for signal light monitors; and
   d. a power management system for providing power to the signal light monitoring system.

6. The signal light monitoring system of claim 5, wherein said sensor unit comprises a combination of diverse sensors, wherein said sensors are simultaneously active, wherein said diverse sensors includes at least one of:
   a. an ambient light sensor;
   b. a color light to digital converter;
   c. a camera sensor;
   d. a 3-axis MEMS accelerometer;
   e. a compass;
   f. a microphone; and
   g. a temperature sensor.

7. The signal light monitoring system of claim 5, wherein said wireless communication module comprises a radio transceiver operating in the industrial, scientific, and medical (ISM) radio band to exchange wireless messages with other said signal light monitors and network interface communicator.

8. The signal light monitoring system of claim 5, wherein said wireless communication module further comprises a low energy Bluetooth® module to exchange wireless messages with other said signal light monitors.

9. The signal light monitoring system of claim 5, wherein said processor further executes a logic to generate and communicate detection messages to said remote server based on input of said diverse sensors of said sensor unit.

10. The signal light monitoring system of claim 1, wherein said wireless communication module comprises a radio transceiver operating in the industrial, scientific, and medical (ISM) radio band to exchange wireless messages with signal light monitors.

11. The signal light monitoring system of claim 1, wherein said wireless communication module comprises a cellular modem configured to connect with said remote server using the cellular data network.

12. The signal light monitoring system of claim 1, wherein said edge processor executes a logic to communicate with said signal light monitors through an ad hoc wireless mesh network.

13. The signal light monitoring system of claim 1 wherein said edge processor further executes a logic to process detection data received from signal light monitors for analysis and communicates with the analyzed data with the remote server.

14. The signal light monitoring system of claim 1 comprising an enterprise network for real-time monitoring of signal light monitors.

15. The signal light monitoring system of claim 1 wherein the power management system comprises:
 a charger responsible for charging backup batteries through solar energy and generating appropriate voltages required for functioning of various components of said signal light monitor;
 a rechargeable battery capable of being charged through solar energy; and
 a solar panel.

16. A signal light monitoring system for detecting the signal light integrity and viewability of a network of signal lights, the system comprising:
 a plurality of signal light enclosures, wherein each of the plurality of signal light enclosures contains a signal light;
 a plurality of signal light monitors attached to each signal light enclosure, wherein each of the signal light monitors includes a sensor unit, a wireless communication module, a processor, and a power management system for providing power to the signal light monitoring system, wherein the sensor unit consists of a plurality of simultaneously active diverse sensors configured to detect signal light intensity, orientation, and viewability of each said signal light and capture detection data representative of signal light integrity and viewability, and the processor is configured to execute logic for establishing a peer-to-peer wireless mesh network of said signal light monitors and communicating said detection data for signal light monitors, wherein each signal light monitor is configured to communicate with each other to form a network of signal light monitors;
 at least one network interface communicator, wherein said network interface communicator is configured to receive detection data from each signal light monitor; and
 a network for receiving the detection data provided by signal light monitors and for configuring the signal light monitors via the at least one network interface communicator.

17. A signal light monitoring system for detecting the signal light integrity and viewability of a network of signal lights, the system comprising:
 a plurality of signal light enclosures, wherein each of the plurality of signal light enclosures contains a signal light;
 a plurality of signal light monitors attached to each signal light enclosure, wherein each of the signal light monitors includes at least one light sensor configured to capture detection data representative of signal light integrity and viewability, wherein each signal light monitor is configured to communicate with each other to form a network of signal light monitors;
 at least one network interface communicator, wherein said network interface communicator is configured to receive detection data from each signal light monitor;
 a network for receiving the detection data provided by signal light monitors and for configuring the signal light monitors via the at least one network interface communicator; and
 a power management system for providing power to the signal light monitoring system, the power management system comprising a charger responsible for charging backup batteries through solar energy and generating appropriate voltages required for functioning of various components of the signal light monitors, a rechargeable battery capable of being charged through solar energy, and a solar panel.

* * * * *